United States Patent [19]

Lewis

[11] Patent Number: 4,882,832
[45] Date of Patent: Nov. 28, 1989

[54] METHOD OF MANUFACTURING ELECTRIC MOTOR STATOR STRUCTURE

[75] Inventor: John G. Lewis, St. Louis, Mo.

[73] Assignee: Emerson Electric Co., St. Louis, Mo.

[21] Appl. No.: 268,008

[22] Filed: Nov. 7, 1988

Related U.S. Application Data

[62] Division of Ser. No. 10,180, Feb. 2, 1987, Pat. No. 4,801,831.

[51] Int. Cl.$^4$ ............................................. H02K 15/02
[52] U.S. Cl. ..................................... 29/596; 29/609; 83/32; 310/42; 310/216
[58] Field of Search ............. 310/42, 89, 91, 216–218, 310/254, 258, 259; 29/596, 598, 609; 83/29, 32

[56] References Cited

U.S. PATENT DOCUMENTS

| | | | |
|---|---|---|---|
| 3,460,415 | 8/1969 | Phillip | 29/609 X |
| 4,536,952 | 8/1985 | Shinryo et al. | 29/596 |
| 4,597,172 | 7/1986 | Bourgeois | 29/596 X |
| 4,712,292 | 12/1987 | King | 29/596 |

Primary Examiner—Carl E. Hall
Attorney, Agent, or Firm—Polster, Polster and Lucchesi

[57] ABSTRACT

A method for manufacturing electric motor stator cores including forming and separating stator core laminations from a sheet of preselected material having a pattern including dovetailing and abutting rows of abutting circles with integral tab portions, each sized to define a core lamination and stacking a preselected number of the separated laminations to provide the basic stator core.

6 Claims, 3 Drawing Sheets

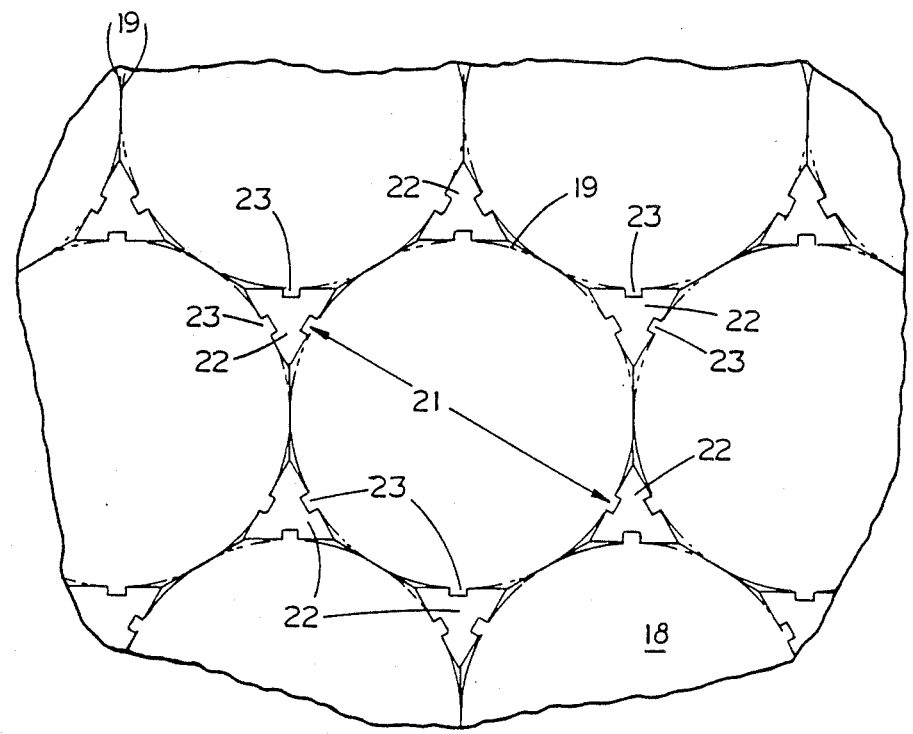
FIG. 3
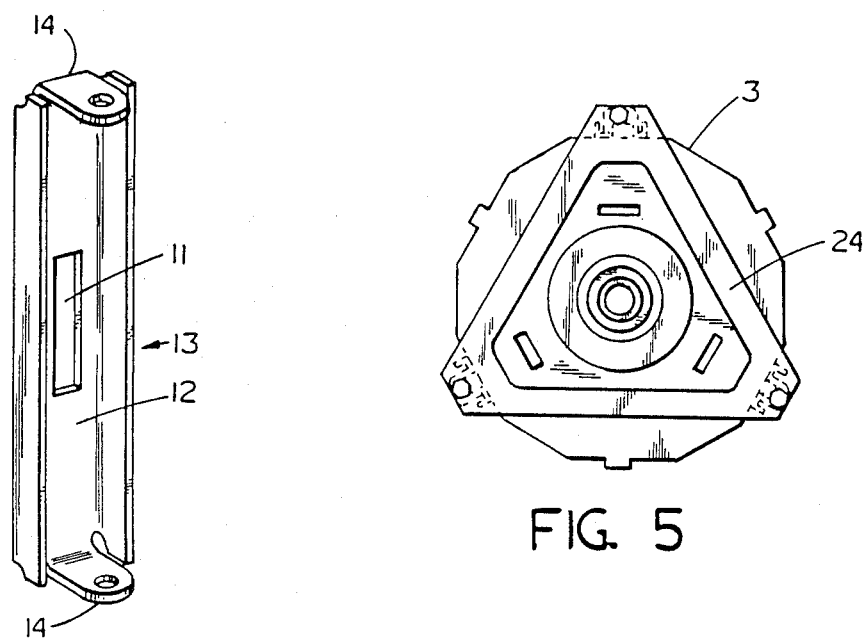
FIG. 2
FIG. 5

METHOD OF MANUFACTURING ELECTRIC MOTOR STATOR STRUCTURE

This is a divisional of copending application Ser. No. 010,180, filed on Feb. 2, 1987, now U.S. Pat. No. 4,801,831 issued Jan. 31, 1989.

BACKGROUND OF THE INVENTION

The present invention relates to electric motors and more particularly to a unique, improved method of manufacture and assembly of electric motor stator structure.

In the electric motor art it has been well known to support spaced motor end shields from the motor stator either by fastening the end shields with appropriate spacer supports to opposed faces of the stator or by passing support members directly through bore holes in the stator, fastening the stator to the support members intermediate their extremities and fastening end shields to the support member extremities. More recently, as disclosed in U.S. Pat. Nos. 4,473,764, issued to Robert W. White on Sept. 25, 1984 and in 4,480,378, also issued to Robert W. White on Nov. 6, 1984; 4,521,953, issued to James L. King et al on June 11, 1985; and, 4,557,041, issued to Robert W. White on Dec. 10, 1985, electric motor assemblies have utilized support members or beam sets secured intermediate their extremities in peripheral slots of a stator, the extremities of the support members passing through apertures in opposed end plates and welded into place.

For the most part, these past assemblies have been comparatively complex and expensive in manufacture and assembly, requiring a multiplicity of assembly steps, a substantial waste of material and often leading to undesirable stresses, alignment problems and assembly discrepancies.

In accordance with the present invention, a unique electric motor structure and method of manufacturing and assembling the same is provided, particularly in the core section thereof, which permits for ready, economical and straightforward manufacture and assembly with a minimum of material wastage and assembly discrepancies without sacrificing parts alignment and motor assembly stability. Various other features of the unique apparatus and method of the present invention will become obvious to one skilled in the art upon reading the disclosure herein.

SUMMARY OF THE INVENTION

More particularly, the present invention provides an improved electric motor structure comprising: a stator and rotor assembly, the rotor being rotatably disposed with reference to the stator and having a rotor shaft extending therefrom; a pair of spaced end shields for rotatably journalling the rotor shaft relative the stator; support means connected to and extending from the spaced end shields to maintain the end shields in spaced relation relative the stator; and, spaced nesting tongue and slot means cooperably positioned between the support means and stator, the tongue means extending laterally relative the peripheral sides of the stator to engage with the slot means with the stator supported intermediate the spaced end shields. In addition, the present invention provides a unique arrangement for attaching the support means to the spaced end shields with a minimum of operational steps and stress factors. Further, the present invention provides an improved and efficient method for manufacturing a stator core for an electric motor and assembling the same, such method comprising: forming a pattern on a sheet of preselected material from which stator core laminations are to be separated, the pattern including at least two abutting rows of abutting circles each preselectively sized to define the active material diameter and confine the main body of a core lamination with adjacent rows of abutting circles being staggered so that peripheries of the adjacent rows of circles substantially dovetail in spaces defined between opposed mirror image arcs of adjacent circles in an adjacent row with peripheries of circles of one row abutting peripheries of two circles of an adjacent row of circles to maximize material usage between circles; separating laminations of preselected shape from the confines of the circles defining the active material diameter of the laminations; and stacking a preselected number of separated laminations to form the basic core of a stator. In addition, the present invention provides a novel method of stacking the laminations to form a stator core and to assemble the stator core in position intermediate spaced end shields.

It is to be understood that various changes can be made by one skilled in the art in the several parts of the novel structure and the several steps of the novel method disclosed herein without departing from the scope or spirit of the present invention.

BRIEF DESCRIPTION OF THE DRAWING

Referring to the drawings which disclose an advantageous embodiment of the present invention and possible modifications thereof;

FIG. 2 is an enlarged isometric view of one of the channel shaped support members of FIG. 1;

FIG. 3 is a top plan view of a portion of a sheet of material disclosing the pattern of the abutting rows of abutting circles as utilized in accordance with the novel method of manufacturing laminations for the stator core of the inventive motor assembly;

FIG. 5 is a top plan view of a modified assembly utilizing three support members and opposed triangularly shaped end shields; and, FIG. 6 is an exploded isometric view of another modified assembly disclosing a modified end shield including support means integral with the end shield and connected to the stator.

DETAILED DESCRIPTION OF THE DRAWING

Figure 1:
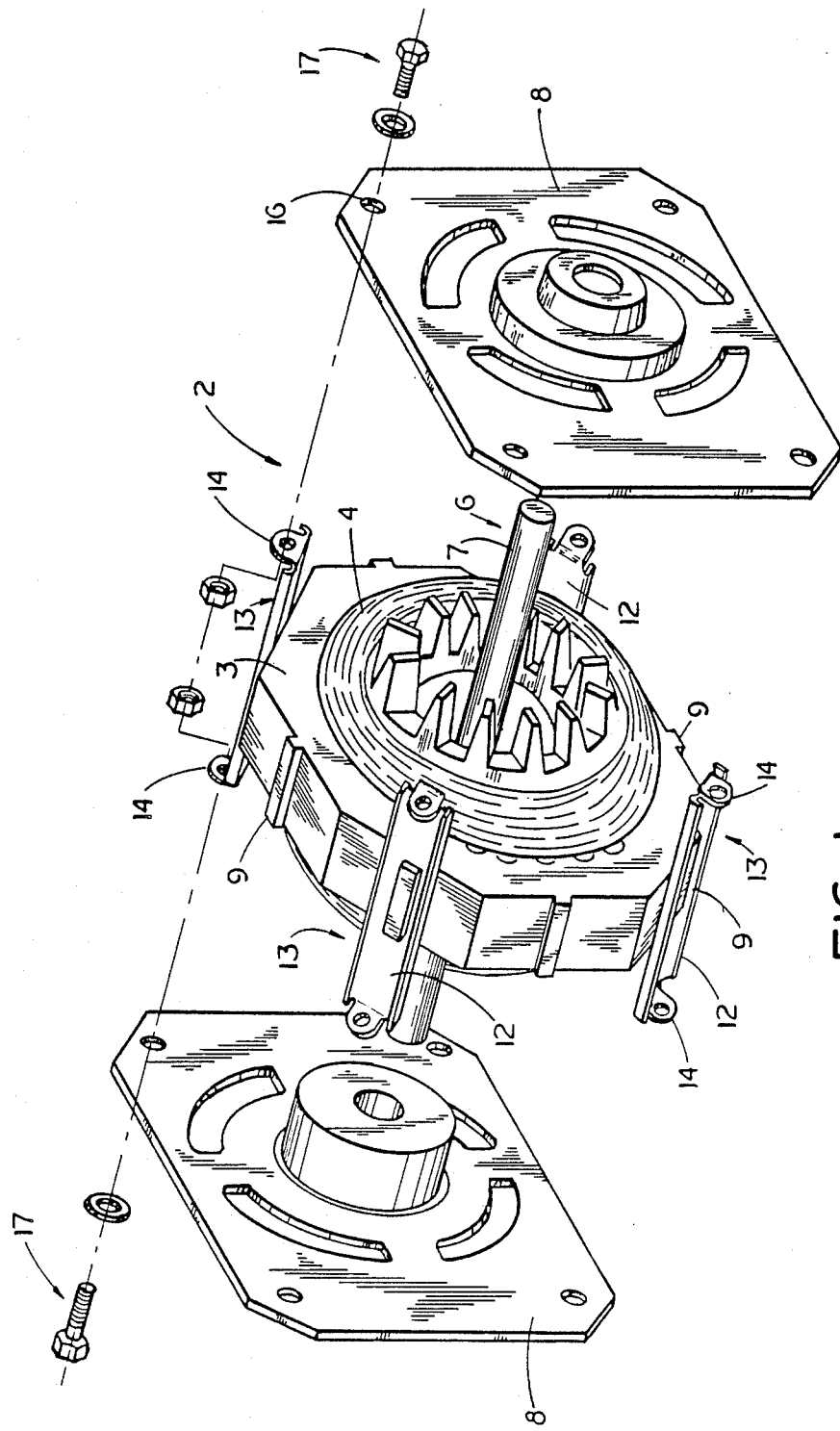
FIG. 1 is an exploded isometric view of the inventive motor assembly disclosing four tongue members of a stator core in engagement with longitudinally extending slots of a set of four channel shaped support members with the extremities of the support members positioned to be fastened at the corners to the inner faces of opposed rectangularly shaped end shields.

As can be seen in FIG. 1, the inventive electric motor assembly 2 includes a stator 3 comprised of a plurality of stacked laminations (the inventive structural and manufacturing details of which will be described hereinafter). As is conventional in the electric motor art and therefore not described in detail herein, stator 3 has a central bore and is appropriately slotted to include stator windings 4. Rotatably disposed within the central bore of stator 3 is rotor assembly 6 having a rotor shaft 7, the ends of which are journalled in a pair of spaced opposed rectangularly shaped end shields 8.

In accordance with the present invention, laminated stator 3 as disclosed includes six peripheral sides with each side having an integral longitudinally extending tongue member 9. As will be described in detail hereinafter, tongue members 9 are formed from integral tab members extending in equally spaced relation along the periphery of the laminations, the tab members of stacked laminations being longitudinally aligned to form the peripherally, equally spaced, longitudinally extending tongue members 9.

As disclosed in FIGS. 1 and 2, four of the six tongue members 9 respectively nest in longitudinally extending, preselectively sized slots 11 formed intermediate the exremities in each of the base legs 12 of channel members 13. Channel members 13 generally are of U-shaped cross-section for added structural strength and stability. Each longitudinally extending tongue member 9 can be press-fitted into a slot 11 of a channel member 13 and, if desired, the longitudinal extremities of each tongue member 9 can be coined or staked (not shown) to insure fast nesting engagement therewith. As will be noted in FIGS. 1 and 2 of the drawings, the base legs 12 of each channel member have their extremities turned at right angles to provide tabs 14. Tabs 14 are apertured and when assembled abut the inner face of an adjacent end shield 8 to be fastened thereto at the apertured corners 16 by the threaded bolt, nut and washer assemblies 17, maintaining stator 3 in stable supported position intermediate the pair of spaced opposed end shields 8.

As can be seen in FIG. 3, the improved method for manufacturing laminations for stator core 3 includes forming a pattern of laminations on a suitable sheet of stator material 18 such as but not limited to a sheet of low carbon steel of 0.025 to 0.030" thickness. The pattern from which the stator core laminations are to be separated includes several abutting rows of abutting circles 19, each circle being preselectively sized to define the active material diameter 21 of the core lamination and confine the main body of the core lamination therein. As can be seen in FIG. 1, the core lamination main body disclosed is of six equal sides. It is to be understood that other geometries can be used and that circle patterns can be of varied sizes to make several sizes of stator cores in accordance with demands and to further the optimum usage of stator core sheet material. As will be noted in FIG. 3, adjacent rows of abutting circles 19 are staggered so that the peripheries of adjacent rows of circles substantially dovetail in the spaces defined between mirror image arcs of adjacent lamination defining circles of an adjacent row of circles with the peripheries of the circles of one row abutting the peripheries of two adjacent circles of an adjacent row of circles. This serves to maximize usage of material on sheet 18 and thus minimize the amount of material 22 between abutting circles. The material 22 between abutting circles 19 serves for the formation of integral tab portions 23 extending from the peripheries of each lamination circle with tabs 23 of each circle being equally spaced from one another along the circle periphery to thus result in tabbed circles being symmetrical for lamination stacking assembly described hereinafter.

Once the circle patterns have been established on sheet 18, the core laminations of preselected shape can be separated from the confines of circles 19 which define the active material diameter 21 of each circle 19. This can be accomplished by suitable machining operations such as stamping, punching, laser separation or hydraulic separation. The stamping can be accomplished in several steps to permit progressive rounding and minimize sharp edge formation and burring. With the tabbed laminations separated, a preselected number of stamped laminations of similar shape can be stacked with adjacent laminations being inverted with respect to one another and corresponding tabs 23 of adjacent laminations in the sheet of material 18 being offset radially an amount equal to a multiple of the peripheral distance between tabs but different than 360° so as to minimize burr and lamination thickness discrepancies. The stacked laminations as they are assembled can be varnished and heated or otherwise joined in fast face-to-face relation in a manner as known in the art to form novel stator core 3 as a unit with peripherally spaced, laterally extending tongues 9. Once the laminated stator core 3 has been assembled as a unit, the tongues 9 of the unified core can be press-fitted into slotted engagement with slots 11 of channel shaped support members 13. As aforenoted, the extremities of tongues 9 can be appropriately coined or staked to provide a fast nesting engagement. The apertures of tabs 14 of support members 13 are aligned with the apertured corners 16 of opposed end shields 8 an the assembly firmly connected together by nut, bolt and washer assemblies 17 with stator core 13 held intermediate the opposed end shields 8 and the rotor assembly properly journalled in the end shields.

Figure 4:
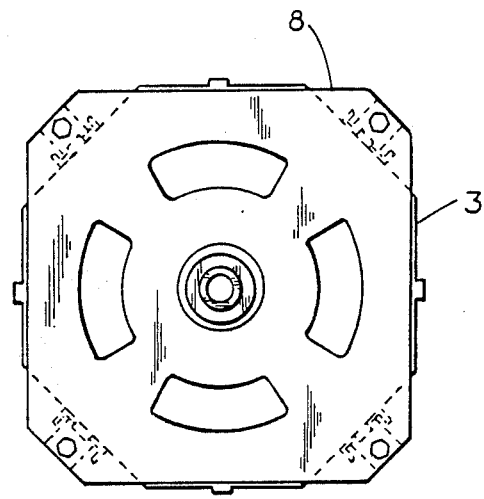
FIG. 4 is a top plan view of the inventive electric motor assembly of FIG. 1.

As can be seen in FIGS. 4 and 5, the same six-sided stator core 3 can be utilized with rectangularly shaped opposed end shields 8 or with triangularly shaped opposed end shields 24.

Figure 6:
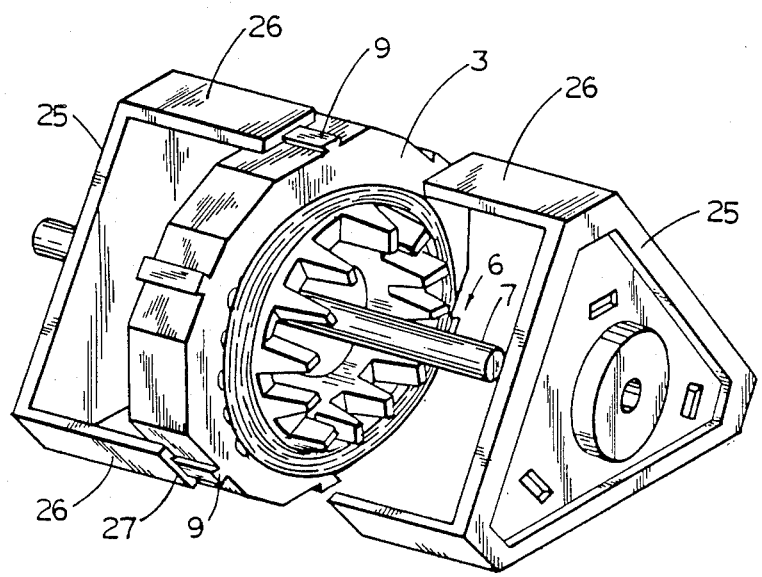

Referring to FIG. 6 of the drawings, a modified arrangement is disclosed wherein modified end shields 25 are disclosed to include integral support means in the form of spaced integral legs 26 extending from the periphery thereof. Legs 26 are each provided with an inwardly facing slot 27 therein to nestingly receive a tongue 9 of stator core 3 in a slidable manner therewith and adhesively fixed in place. It is to be understood that the longitudinally extending tongue and slot arrangement need not necessarily extend continuously from one face of the stator to the opposite face but can be interrupted. Accordingly, in the method of manufacture abovedescribed, some of the peripherally extending tabs on the laminations would be omitted.

It is to be understood that other types of support members and geometries can be utilized by one skilled in the art without departing from the scope or spirit of the invention. For example, it would be possible to peripherally space the tabs of the laminations in a different manner, to use laterally extending U-shaped tongue clips which grip holes in the opposite stator faces, to slot the stator and utilize tongues on the support members to nest with such slots, or to form the end shields in cup shape with the inner side walls having spaced, longitudinally extending slots in which the tongues of the stator engage.

The invention claimed is:

1. A method for manufacturing laminations of a stator core for an electric motor comprising:
   forming a pattern on a sheet of preselected material from which stator core laminations are to be separated, said pattern including at least two abutting rows of abutting circles each preselectively sized to defined the active material diameter and confine the main body of a core lamination with adjacent rows of abutting circles being staggered so that peripheries of adjacent rows of circles substantially dovetail in spaces defined between opposed mirror image arcs of adjacent circles in an adjacent row with peripheries of circles of one row abutting peripheries of two adjacent circles of an adjacent row of circles to maximize material usage on said sheets with said abutting circles including peripheral tab portions integral therewith to extend from the peripheries thereof into the material between circles;

separating laminations of preselected shape form the confines of said circles and integral tab portions defining the active material diameter of said laminations; and, stacking a preselected number of separated laminations with said integral tab portions in stacked alignment to provide tongues cooperatively insertable into opposed slotted support members to form the basic core of a stator.

2. The method of claim 1 wherein said laminations are separated so as to be substantially symmetrical; and
wherein adjacent laminations in stacking are inverted with respect to one another to minimize burr and lamination thickness discrepancies.

3. The method of claim 1, wherein said separation is accomplished by cutting.

4. The method of claim 1, wherein said separation is accomplished in several steps to minimize sharp edge formation.

5. The method of claim 1, wherein corresponding integral tabs of adjacent laminations in said sheet of material in stacking are offset an amount equal to a multiple of the peripheral distance between tabs to minimize burr and lamination thickness discrepancies.

6. A method for manufacturing and assembling a stator core of an electric motor comprising:

forming a pattern on a sheet of preselected material from which said laminations are to be separated, said pattern including several abutting rows of abutting circles each preselectively sized to define the active material diameter and confine the main body of a core lamination with adjacent rows of abutting circles being staggered so that the peripheries of adjacent rows of circles substantially dovetail in spaces defined between mirror image arcs of adjacent circles of an adjacent row of circles with the peripheries of the circles of one row substantially abutting the peripheries of two adjacent circles of an adjacent row of circles to maximize the usage of material on said sheet, said abutting circles having integral tab portions extending from the peripheries thereof into the material between circles with the tabs of each circle being equally spaced from one another along the periphery thereof with the tabbed circles being symmetrical;

stamping the laminations of preselected shape from the confines of said circles defining the active material diameter of said laminations, said stamping being accomplished in several separate steps to minimize sharp edge formation;

stacking a preselected number of stamped laminations with adjacent laminations being inverted with respect to one another and corresponding tabs of adjacent laminations in said sheet of material being offset an amount equal to a multiple of the peripheral distance between tabs to minimize burr and lamination thickness discrepancies, said stacked laminations forming a stator core with peripherally spaced, laterally extending tongues;

press-fitting said tongues into engagement with opposed slotted support members; and, connecting said support members at the opposite extremities thereof to spaced end shields.

* * * * *